United States Patent [19]
Parce

[11] Patent Number: 6,012,902
[45] Date of Patent: Jan. 11, 2000

[54] MICROPUMP

[75] Inventor: John Wallace Parce, Palo Alto, Calif.

[73] Assignee: Caliper Technologies Corp., Mountain View, Calif.

[21] Appl. No.: 08/937,958

[22] Filed: Sep. 25, 1997

[51] Int. Cl.[7] .................................................. F04B 37/00
[52] U.S. Cl. ............................................. 417/48; 417/50
[58] Field of Search ........................................ 417/48, 50

[56] References Cited

U.S. PATENT DOCUMENTS

| | | | |
|---|---|---|---|
| 3,923,426 | 12/1975 | Theeuwes | ................................ 417/48 |
| 4,675,300 | 6/1987 | Zare et al. . | |
| 4,908,112 | 3/1990 | Pace . | |
| 5,126,022 | 6/1992 | Soane et al. . | |
| 5,256,036 | 10/1993 | Cole | ........................ 417/48 |
| 5,358,612 | 10/1994 | Dasgupta . | |
| 5,585,069 | 12/1996 | Zanzucchi et al. . | |
| 5,603,351 | 2/1997 | Cherukuri et al. . | |
| 5,646,039 | 7/1997 | Northrup et al. . | |
| 5,660,703 | 8/1997 | Dasgupta . | |
| 5,846,396 | 12/1998 | Zanzucchi et al. | ....................... 417/50 |

FOREIGN PATENT DOCUMENTS

| | | | |
|---|---|---|---|
| 945733 | 5/1949 | France | ..................... 417/50 |
| WO 96/04547 | 2/1996 | WIPO . | |
| WO 97/02357 | 1/1997 | WIPO . | |

OTHER PUBLICATIONS

Hinckley, J.O.N., "Transphoresis and Isotachophoresis as Preparative Techniques with Reference to Zero–Gravity," AIAA/ASME 1974 Thermophysics and Heat Transfer Conference, Jul. 15–17, 1974, AIAA Paper No. 74–664, Boston, MA.

Dasgupta, P.K. et al., "Electroosmosis: A Reliable Fluid Propulsion System for Flow Injection Analysis," *Anal. Chem.* 66:1792–1798 (1994).

Manz, A. et al., "Electroosmotic pumping and electrophoretic separations for miniaturized chemical analysis systems," *J. Micromech. Microeng.* 4:257–265. (1994).

Ramsey, J.M. et al., "Microfabricated chemical measurement systems," *Nature Medicine*, 1(10):1093–1096 (1995).

Seiler, K. et al., "Planar Glass Chips for Capillary Electrophoresis: Repetitive Sample Injection, Quantitation, and Separation Efficiency," *Anal. Chem.* 65:1481–1488 (1993).

*Primary Examiner*—Charles G. Freay
*Assistant Examiner*—Cheryl J. Tyler
*Attorney, Agent, or Firm*—Matthew B. Murphy

[57] ABSTRACT

The present invention generally provides a micropump that utilizes electroosmotic pumping of fluid in one channel or region to generate a pressure based flow of material in a connected channel, where the connected channel has substantially no electroosmotic flow generated. Such pumps have a variety of applications, and are particularly useful in those situations where the application for which the pump is to be used prohibits the application of electric fields to the channel in which fluid flow is desired, or where pressure based flow is particularly desirable.

29 Claims, 4 Drawing Sheets

MICROPUMP

BACKGROUND OF THE INVENTION

The field of microfluidics has gained substantial attention as a potential answer to many of the problems inherent in conventional chemical, biochemical and biological analysis, synthesis and experimentation. In particular, by miniaturizing substantial portions of laboratory experimentation previously performed at a lab bench, one can gain substantial advantages in terms of speed, cost, automatibility, and reproducibility of that experimentation. This substantial level of attention has led to a variety of developments aimed at accomplishing that miniaturization, e.g., in fluid and material handling, detection and the like.

U.S. Pat. No. 5,271,724 to van Lintel, for example reports a microscale pump/valve assembly fabricated from silicon using manufacturing techniques typically employed in the electronics and semiconductor industries. The microscale pump includes a miniature flexible diaphragm as one wall of a pump chamber, and having a piezoelectric element mounted upon its exterior surface.

Similarly, U.S. Pat. No. 5,375,979 to Trah, reports a mechanical micropump/valve assembly that is fabricated from three substrate layers. The pump/valve assembly consists of a top cover layer disposed over a middle layer having a cavity fabricated therein, to define the pumping chamber. The bottom layer is mated with the middle layer and together, these substrates define each of two, one way flap valves. The inlet valve consists of a thin flap of the middle substrate layer that is disposed over an inlet port in the bottom substrate layer, and seated against the bottom layer, such that the flap valve will only open inward toward the pump chamber. A similar but opposite construction is used on the outlet valve, where the thin flap is fabricated from the bottom layer, is seated over the outlet port and against the middle layer such that the valve only opens away from the pump chamber. The pump and valves cooperate to ensure that fluid moves in only one direction.

Published PCT Application No. 97/02357 reports an integrated microfluidic device incorporating a microfluidic flow system in combination with an oligonucleotide array. The microfluidic system moves fluid by application of external pressures, e.g., via a pneumatic manifold, or through the use of diaphragm pumps and valves.

While these microfabricated pumps and valve., provide one means of transporting fluids within microfabricated substrates, their fabrication methods and materials can be somewhat complex, resulting in excessive volume requirements, as well as resulting in an expensive manufacturing process.

Published PCT Application No. 96/04547 to Ramsey, describes an elegant method of transporting and directing fluids through an interconnected channel structure using controlled electrokinetic forces at the intersections of the channels, to control the flow of material at those intersections. These material transport systems employ electrodes disposed in contact with the various channel structures to apply the controlled electrokinetic forces. These methods have been adapted for a variety of applications, e.g., performing standard assays, screening of test compounds, and separation/sequencing of nucleic acids, and the like. See, e.g., commonly assigned U.S. patent application Ser. No. 08/761,575, filed Dec. 6, 1996, U.S. patent application Ser. No. 08/835,101, filed Apr. 4, 1997 and U.S. patent application Ser. No. 08/845,754, filed Apr. 25, 1997, all of which are incorporated herein by reference in its entirety for all purposes. These "solid state" material transport systems combine a high degree of controllability with an ease of manufacturing.

Despite the numerous advantages of using controlled electrokinetic material transport in microfluidic systems, in some cases it is desirable to combine the ease of control and fabrication attendant to such systems; with the benefits of pressure-based fluid transport systems. The present invention meets these and other needs.

SUMMARY OF THE INVENTION

The present invention provides microfluidic systems that incorporate the ease of fabrication and operation of controlled electrokinetic material transport systems, with the benefits of pressure-based fluid flow in microfluidic systems. The present invention accomplishes this by providing, in a first aspect, a microfluidic device having a body structure with at least one microscale channel disposed therein, and also having an integrated micropump in fluid communication with the microscale channel. The micropump comprises a first microscale channel portion having first and second ends, and a second microscale channel portion having first and second ends. The second channel portion has a first effective surface charge associated with its walls. The first end of the second channel portion is in fluid communication with the first end of the first channel portion at a first channel junction. The pump also includes a means for applying a voltage gradient between the first and second ends of the second channel portion while applying substantially no voltage gradient between the first and second ends of the first channel portion.

The microfluidic devices and micropumps of the present invention may also include a third channel portion that is in communication with the channel junction, and which includes a charge associated with its surface. This charge may be the same as or substantially opposite to that of the second channel portion. This third channel portion also typically includes a means for applying a voltage gradient across its length, which means may be the same as or different from that used to apply a voltage gradient across the length of the second channel portion.

In a related aspect, the present invention also provides a method of transporting fluid in a microfluidic channel structure, which comprises providing a micropump of the present invention. The method also comprises applying an appropriate voltage gradient along the length of the second channel portion to produce an electroosmotically induced pressure within the second channel portion. This is followed by the transmission of that pressure to the first channel portion whereupon pressure-based flow is achieved in that first channel.

DETAILED DESCRIPTION OF THE INVENTION

The present invention generally provides a micropump that utilizes electroosmotic pumping of fluid in one channel or region to generate a pressure based flow of material in a connected channel, where the connected channel has substantially no electroosmotic flow generated. Such pumps have a variety of applications, and are particularly useful in those situations where the application for which the pump is to be used prohibits the application of electric fields to the channel in which fluid flow is desired, or where pressure based flow is particularly desirable. Such applications include those involving the transport of materials that are not easily or predictably transported by electrokinetic flow systems, e.g.: materials having high ionic strengths; nonaqueous materials; materials having electrophoretic mobilities that detract from bulk electroosmotic material transport; or materials which interact with the relevant surfaces of the system, adversely affecting electrokinetic material transport.

Alternatively, in some instances pressure based flow is desirable for other reasons. For example, where one wishes to expel materials from the interior portion or channels of a microfluidic system, or to deliver a material to an external analytical system, it may be impracticable to electrokinetically transport such materials over the entire extent of the ultimate flow path. Examples of the above instances include administration of pharmaceutical compounds for human or veterinary therapy, or for administration of insecticides, e.g., in veterinary applications.

The micropumps of the present invention typically utilize and are made up of channels incorporated into microfluidic device or system in which such pumps are to be used. By "microfluidic device or system" is typically meant a device that incorporates one or more interconnected microscale channels for conveying fluids or other materials. Typically, the microscale channels are incorporated within a body structure. The body structure of the microfluidic devices described herein typically comprises an aggregation of two or more separate layers which when appropriately mated or joined together, form the microfluidic device of the invention, e.g., containing the channels and/or chambers described herein. Typically, the microfluidic devices described herein will comprise a top portion, a bottom portion, and an interior portion, wherein the interior portion substantially defines the channels and chambers of the device.

As used herein, the term microscale refers to channel structures which have at least one cross-sectional dimension, i.e., width, depth or diameter, that is between about 0.1 and 500 µm, and preferably, between about 1 and about 200 µm. In particularly preferred aspects, a channel for normal material transport will be from about 1 to about 50 µm deep, while being from about 20 to about 100 µm wide. These dimensions may vary in cases where a particular application requires wider, deeper or narrower channel dimensions, e.g., as described below.

In preferred aspects, the microfluidic devices incorporating the micropumps according to the present invention utilize a two-layer body structure. The bottom portion of the device typically comprises a solid substrate which is substantially planar in structure, and which has at least one substantially flat upper surface. A variety of substrate materials may be employed as the bottom portion. Typically, because the devices are microfabricated, substrate materials will be selected based upon their compatibility with known microfabrication techniques, e.g., photolithography, wet chemical etching, laser ablation, air abrasion techniques, injection molding, embossing, and other techniques. The substrate materials are also generally selected for their compatibility with the full range of conditions to which the microfluidic devices may be exposed, including extremes of pH, temperature, salt concentration, and application of electric fields. Accordingly, in some preferred aspects, the substrate material may include materials normally associated with the semiconductor industry in which such microfabrication techniques are regularly employed, including, e.g., silica based substrates, such as glass, quartz, silicon or polysilicon, as well as other substrate materials, such as gallium arsenide and the like. In the case of semiconductive materials, it will often be desirable to provide an insulating coating or layer, e.g., silicon oxide, over the substrate material, and particularly in those applications where electric fields are to be applied to the device or its contents.

In additional preferred aspects, the substrate materials will comprise polymeric materials, e.g., plastics, such as polymetllylmethacrylate (PMMA), polycarbonate, polytetrafluoroethylene (TEFLON™), polyvinylchloride (PVC), polydimethylsiloxane (PDMS), polysulfone, and the like. Such polymeric substrates are readily manufactured using available microfabrication techniques, as described above, or from microfabricated masters, using well known molding techniques, such as injection molding, embossing or stamping, or by polymerizing the polymeric precursor material within the mold (See U.S. Pat. No. 5,512,131). Such polymeric substrate materials are preferred for their ease of manufacture, low cost and disposability, as well as their general inertness to most extreme reaction conditions.

As described in greater detail below, the channel portions of the devices of the present invention typically include, at least in part, channel surfaces that have charged functional groups associated therewith, in order to produce sufficient electroosmotic flow to generate the requisite pressures in those channels in which no electroosmotic flow is taking place. In the case of silica based substrates, negatively charged hydroxyl groups present upon the etched surfaces of the channels are typically more than sufficient to generate sufficient electroosmotic flow upon application of a voltage gradient along such channels. In the case of other substrate materials, or cases where substantially no surface charge, or a positive surface charge is required, the surface of these channels is optionally treated to provide such surface charge. A variety of methods may be used to provide substrate materials having an appropriate surface charge, e.g., silanization, application of surface coatings, etc. Use of such surface treatments to enhance the utility of the microfluidic system, e.g., provide enhanced fluid direction, is described in U.S. patent application Ser. No. 08/843,212, filed Apr. 14, 1997 (Attorney Docket No. 17646-002610), which is incorporated herein by reference in its entirety for all purposes.

The channels and/or chambers of the microfluidic devices are typically fabricated into the upper surface of the bottom substrate or portion, as microscale grooves or indentations, using the above described microfabrication techniques. The top portion or substrate also comprises a first planar surface, and a second surface opposite the first planar surface. In the microfluidic devices prepared in accordance with the methods described herein, the top portion also includes a plurality of apertures, holes or ports, disposed therethrough, e.g., from the first planar surface to the second surface opposite the first planar surface.

The first planar surface of the top substrate is then mated, e.g., placed into contact with, and bonded to the planar surface of the bottom substrate, covering and sealing the grooves and/or indentations in the surface of the bottom substrate, to form the channels and/or chambers (i.e., the interior portion) of the device at the interface of these two components. The holes in the top portion of the device are oriented such that they are in communication with at least one of the channels and/or chambers formed in the interior portion of the device from the grooves or indentations in the bottom substrate. In the completed device, these holes function as reservoirs for facilitating fluid or material introduction into the channels or chambers of the interior portion of the device, as well as providing ports at which electrodes may be placed into contact with fluids within the device, allowing application of electric fields along the channels of the device to control and direct fluid transport within the device. Although the terms "port" and "reservoir" are typically used to describe the same general structural element, it will be readily appreciated that the term "port" generally refers to a point at which an electrode is placed into electrical contact with the contents of a microfluidic channel or system. Similarly, the term "reservoir" typically denotes a chamber or well which is capable of retaining fluid that is to be introduced into the various channels or chambers of the device. Such reservoirs may or may not have an associated electrode, i.e., functioning as a port.

In many embodiments, the microfluidic devices will include an optical detection window disposed across one or more channels and/or chambers of the device. Optical detection windows are typically transparent such that they are capable of transmitting an optical signal from the channel/chamber over which they are disposed. Optical detection windows may merely be a region of a transparent cover layer, e.g., where the cover layer is glass or quartz, or a transparent polymer material, e.g., PMMA, polycarbonate, etc. Alternatively, where opaque substrates are used in manufacturing the devices, transparent detection windows fabricated from the above materials may be separately manufactured into the device.

These devices may be used in a variety of applications, including, e.g., the performance of high throughput screening assays in drug discovery, immunoassays, diagnostics, genetic analysis, and the like. As such, the devices described herein, will often include multiple sample introduction ports or reservoirs, for the parallel or serial introduction and analysis of multiple samples. Alternatively, these devices may be coupled to a sample introduction port, e.g., a pipetor, which serially introduces multiple samples into the device for analysis. Examples f such sample introduction systems are described in e.g., U.S. patent application Ser. Nos. 08/761,575 and 08/760,446 (Attorney Docket Nos. 17646-000410 and 17646-000510, respectively) each of which was filed on Dec. 6, 1996, and is hereby incorporated by reference in its entirety for all purposes.

As noted, the micropumps described herein typically comprise, at least in part, the microscale channels that are incorporated in to the overall microfluidic device. In particular, such pumps typically include a first microscale channel portion having first and second ends that is in fluid communication with a second channel portion at a first channel junction. The second channel portion typically has a surface charge associated with the walls of that channel portion, which charge is sufficient to propagate adequate levels of electroosmotic flow, specifically, the flow of fluid and material within a channel or chamber structure which results from the application of an electric field across such structures.

In brief, when a fluid is placed into a channel which has a surface, bearing charged functional groups, e.g., hydroxyl groups in etched glass channels or glass microcapillaries, those groups can ionize. The nature of the charged functional groups can vary depending upon the nature of the substrate and the treatments to which that substrate is subjected, as described in greater detail, below. In the case of hydroxyl functional groups, this ionization, e.g., at neutral pH, results in the release of protons from the surface into the fluid, resulting in a localization of cationic species within the fluid near the surface, or a positively charged sheath surrounding the bulk fluid in the channel. Application of a voltage gradient across the length of the channel, will cause the cation sheath to move in the direction of the voltage drop, i.e., toward the negative electrode, moving the bulk fluid along with it.

As noted above, the channel portions are typically fabricated into a planar solid substrate. A voltage gradient is applied across the length of the second channel portion via electrodes disposed in electrical contact with those ends, whereupon the voltage gradient causes electroosmotic flow of fluid within the second channel portion. The pressure developed from this electroosmotic flow is translated through the channel junction to the first channel portion. In accordance with the present invention, the first channel portion produces substantially no electroosmotic flow, by virtue of either or both of: (1) a lack of charged groups on the surfaces or walls of the first channel; or (2) the absence of a voltage gradient applied across the length of the first channel. As a result, the sole basis for material flow within the first channel portion is a result of the translation of pressure from the second channel portion to the first.

Figure 1:
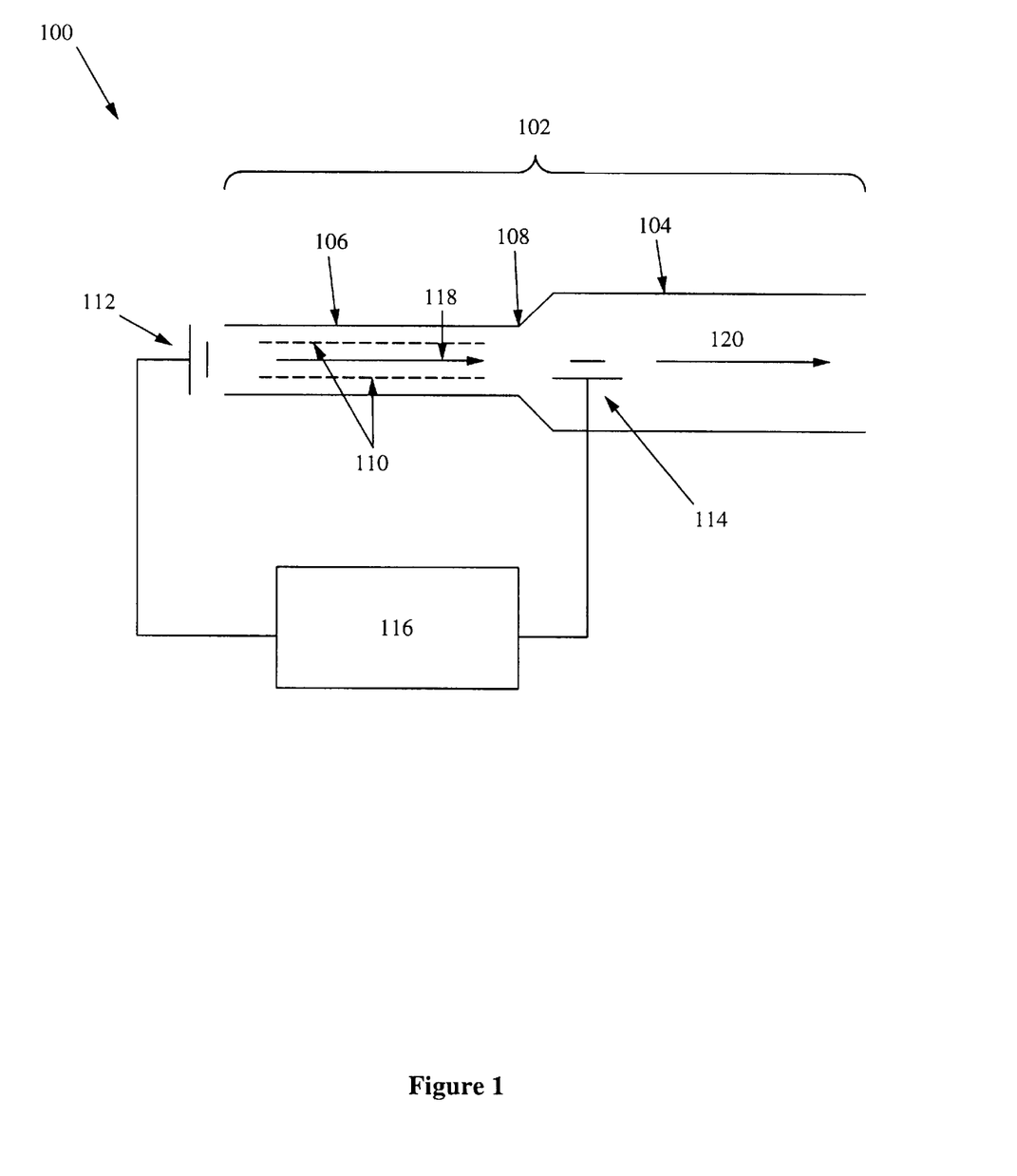
FIG. 1 is a schematic illustration of one embodiment of a microscale electroosmotic pressure pump according to the present invention.

FIG. 1 illustrates a simplified schematic illustration of a micropump 100 according to the present invention. As shown, the pump includes a microscale channel structure 102 which includes a first channel portion 104 and a second channel portion 106 that are in fluid communication at a channel junction point 108. Second channel portion 106 is shown as including charged functional groups 110 on its wall surfaces. Although illustrated as negatively charged groups, it will be appreciated that positively charged functional groups are optionally present on the surface of the channels. The direction of fluid flow depends upon the direction of the voltage gradient applied as well as the nature of the surface charge, e.g., substantially negative or substantially positive. By "substantially negative" or "substantially positive" is meant that in a given area of the channel surface, the surface charge is net negative or net positive. As such, some level of mixed charge is tolerated, provided it does not detract significantly from the application of the channel, e.g., in propagating sufficient electroosmotic flow, e.g., whereby those surfaces or channel walls are capable of supporting an electroosmotic mobility ($\mu EO$) of at least about $1 \times 10^{-5}$ $cm^2 V^{-1} s^{-1}$, for a standard sodium borate buffer having an ionic strength of between about 1 mM and about 10 mM, at a pH of from about 7 to about 10, disposed within those channels.

Differential surface charges, whether oppositely charged, or having varied charge densities among two or more channels, may be achieved by well known methods. For example, surfaces are optionally treated with appropriate coatings, e.g., neutral or charged coatings, charge neutralizing or charge adding reagents, e.g., protecting or capping groups, silanization reagents, and the like, to enhance charge densities, and/or to provide net opposite surface charges, e.g., using aminopropylsilanes, hydroxypropylsilanes, and the like.

Electrodes 112 and 114 are shown disposed in electrical contact with the ends of the second channel portion. These electrodes are in turn, coupled to power source 116, which delivers appropriate voltages to the electrodes to produce the requisite voltage gradient. Application of a voltage gradient between electrode 112 and electrode 114, e.g., a higher voltage applied at electrode 112, results in the propagation of electroosmotic flow within the second channel portion 106, as illustrated by arrow 118, while producing substantially no electroosmotic flow in the first channel portion. Electroosmotic flow is avoided in the first channel portion by either providing the first channel portion with substantially no net surface charge to propagate electroosmotic flow, or alternatively and preferably, electroosmotic flow is avoided in the first channel portion by applying substantially no voltage gradient across the length of this channel portion. The phrase "applying substantially no voltage gradient across the first channel portion," means that no electrical forces are applied to the ends of the first channel portion whereby a voltage gradient is generated therebetween.

The electroosmotic flow of material in the second channel portion 106, produces a resultant pressure which is translated through channel junction 108 to the first channel portion 104, resulting in a pressure based flow of material in the first channel portion 104, as shown by arrow 120.

In particularly preferred aspects, the channel portion responsible for propagating electroosmotic fluid flow, e.g., the second channel portion 106, will include a narrower cross-sectional dimension, or will include a portion that has a narrower cross-sectional dimension than the remainder of the microscale channels in the overall channel structure, i.e., the first channel portion. In particular, electrokinetic flow velocity of material in a microscale channel or capillary is independent of the diameter of the channel or capillary in which such flow is taking place. As such, the flow volume is directly proportional to the cross sectional area of the channel. For a rectangular channel of width ("w") and height ("h") where h<<w, the flow volume is proportional to h for a given w. In contrast, however, for poiseulle flow, the flow volume for a given pressure is inversely proportional to $h^3$. It follows therefore, that as the height of the capillary channel is decreased, greater and greater pressures are required to counteract the prevailing electroosmotic flow. Accordingly, by reducing the height of a channel in which fluids are being pumped electroosmotically, one can significantly increase the amount of pressure produced thereby (e.g., by a factor of $h^2$).

The precise dimensions of the channels used for propagating the increased pressures, also termed "pumping channels," typically varies depending upon the particular application for which such pumping is desired, e.g., the pressure needs of the application. Further, pressure levels also increase with the length of the channel through which the material is being transported. Typically, these pumping channels will be anywhere in the microscale range. Generally, although not required, the pumping channels will be narrower or shallower than the non-pumping channels contained within the microfluidic device. Typically, although by no means always, such pumping channels will vary from the remaining, non-pumping channels of the device in only one of the width or depth dimensions. As such, these pumping channels will typically be less than 75% as deep or wide as the remaining channels, preferably, less than 50% as deep or wide, and often, less than 25% and even as low as 10% or less deep or wide than the remaining channels of the device.

Although FIG. 1 schematically illustrates the point of electrical contact between electrode 114 and channel junction 108, e.g., the port, as being disposed within the overall channel comprised of the first and second channel portions 104 and 106, respectively, in preferred aspects, it is desirable to avoid the placement of electrodes within microscale channels. In particular, electrolysis of materials at the electrode within these channels can result in substantial gas production. Such gas production can adversely effect material transport in these channels, e.g., resulting in 'vapor lock', or substantially increasing the level of resistance through a given channel.

Figure 2:
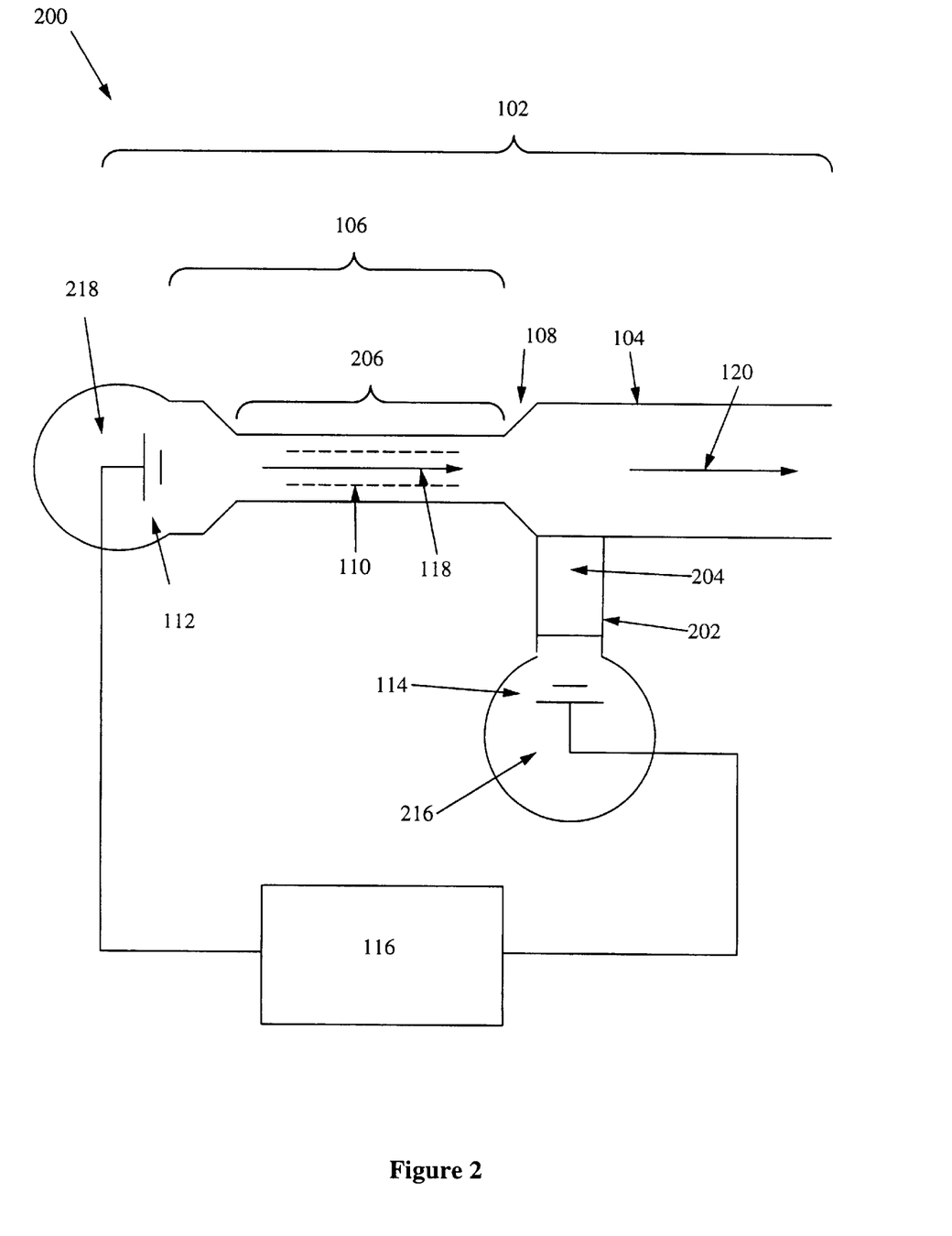
FIG. 2 illustrates an alternate embodiment of a pressure pump according to the present invention, incorporating a flow restrictive channel for shunting of the current used to drive electroosmotic flow.

As such, the electrodes are typically disposed in electrical communication with ports or reservoirs that are, in turn, in fluid and electrical communication with relevant the channel portion. An example of this modified micropump structure is illustrated in FIG. 2.

As shown, the micropump 200 again includes; channel structure 102, which comprises first channel portion 104 and second channel portion 106, in fluid communication at a channel junction 108. Again, the second channel portion includes walls having an appropriate surface charge 110, and a region of narrowed cross-sectional dimension 206, to optimize the ratio of pressure to electroosmotic flow. Electrodes 112 and 114, are coupled to power source 116, and are in electrical contact with the ends of second channel 106 via reservoirs 218 and 216, respectively. Again, these electrodes deliver an appropriate voltage gradient across the length of the second channel portion 106.

In order to apply an appropriate voltage gradient across second channel portion 106 without placing electrode 114 into the channel through which fluid movement is desired, i.e., at channel junction 108, the electrode is instead placed in electrical communication with a side channel 202. As described for electrode placement above, this electrode is typically disposed within a reservoir 216 that is located at the unintersected terminus of side channel 202. Side channel 202 typically includes an appropriate flow restrictive element 204. The flow restrictive element is provided to allow passage of current between the two electrodes, while substantially preventing fluid flow through side channel 202, also termed a flow restrictive channel. As a result, the electroosmotic flow of fluid through second channel portion 106 translates it's associated pressure into first channel portion 104.

In at least a first aspect, the flow restrictive element includes a fluid barrier that prevents flow of fluid, but permits transmission of electrons or ion species, e.g., a salt bridge. Examples of such materials include, e.g., agarose or polyacrylamide gel plugs disposed within the side channel 202. Alternatively, the side channel 202 may comprise a series of parallel channels each having a much smaller cross-sectional area than the remainder of the channel structure, to reduce electroosmotic flow through the side channel. Again, the width or depth of these flow restrictive channels will depend upon the application for which the pump is to be used, i.e., depending upon the amount of pressure which they must withstand, provided again that they are narrower or shallower than the remaining channels of the overall device. Typically, however, these small diameter channels will have at least one cross sectional dimension in the range of from about 0.001 to about 0.05 $\mu$m. Typically, this narrow cross-section will be the depth dimension, while the width of these channels be on the order of from about 0.1 to about 50 $\mu$m, and preferably, from about 1 to about 10 $\mu$m. This is as compared to the width of second channel portion which typically ranges from about 20 to about 100 $\mu$m. Side channel 202, which optionally includes a plurality of parallel channels, also substantially lacks surface charge, to reduce or eliminate any electroosmotic flow along the side channel 202.

Figure 3:
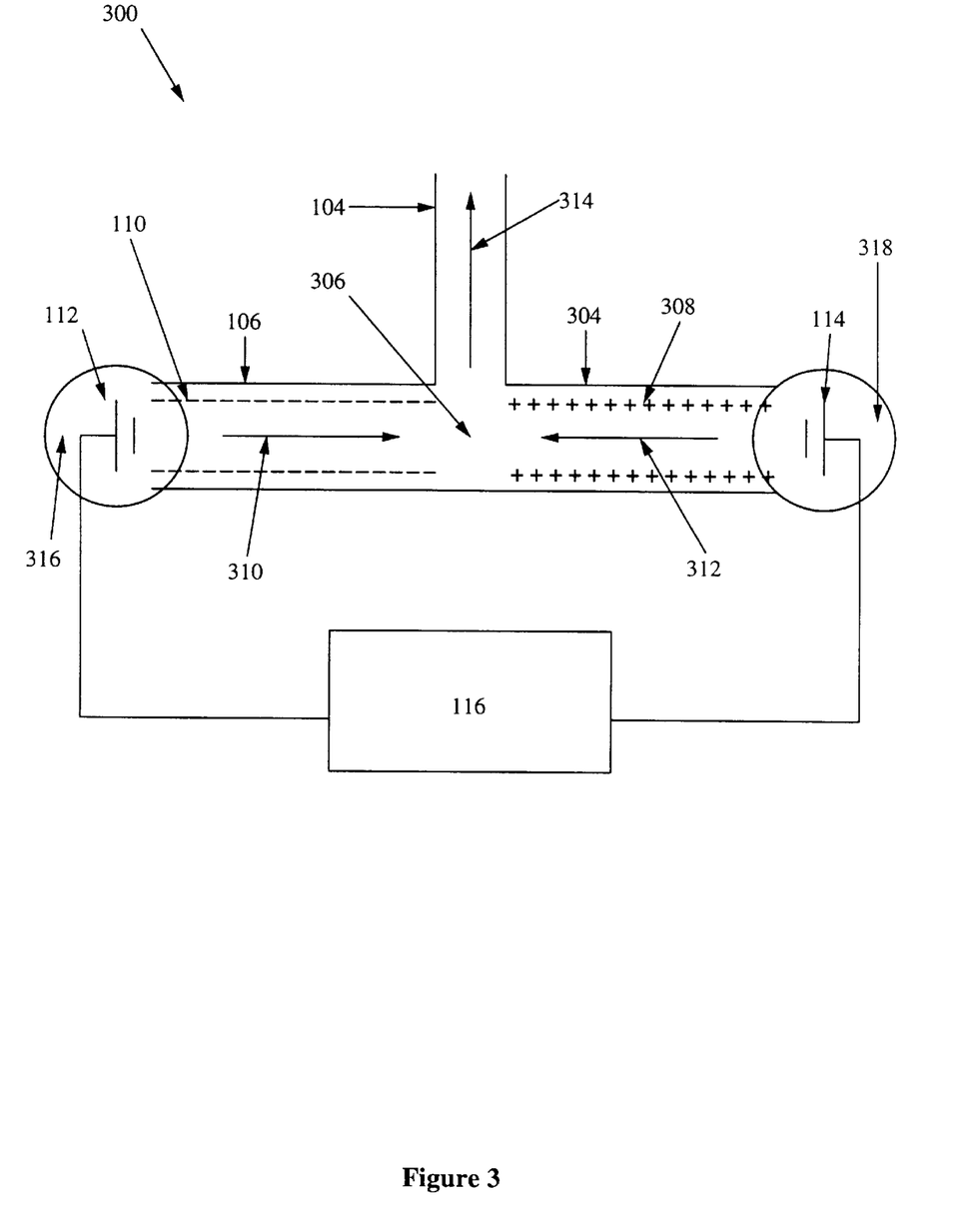
FIG. 3 illustrates still another embodiment of a micropump according to the present invention. As shown the micropump includes two pumping channels having oppositely charged surfaces.

FIG. 3 illustrates still another embodiment of the electroosmotic pressure pump according to the present invention. This embodiment of the micropump has the added advantage of not requiring a side channel to shunt off current, e.g., as shown in FIG. 2. In particular, as shown, the pump 300 includes a channel structure which is comprised of a first channel portion 104, a second channel portion 106, and a third channel portion 304, all of which are in fluid communication at the channel junction 306. The second and third channel portions 106 and 304, include substantially different surface charges 110 and 308, respectively, on their surfaces or channel walls (shown as negative charged groups in second channel portion 106 and positive charged groups in third channel portion 304). By "substantially different surface charge" is meant that two surfaces will have respective surface charges that are substantially different in charge density or substantially different in type of charge, e.g., positive versus negative. Substantially different charge densities include two surfaces where one surface has a charge density that is at least 10% lower than the other surface, typically greater than 20% less, preferably, greater than 30% less, and more preferably, greater than 50% less. Determination of relative surface charge density is typically carried out by known methods. For example, appropriate comparisons are made by determination of surface potential as measured by the surfaces' ability to propagate electroosmotic flow of a standard buffer, as noted above. This also includes instances where one surface is neutral as compared to the other surface that bears a charge, either positive or negative.

By "substantially oppositely charged," is meant that the net charge on two surfaces are substantially opposite to each other, e.g., one is substantially positive, while the other is substantially negative. Thus, each surface can have surface charges of each sign, provided that the overall net charge of the surface is either positive, or negative.

The effect of these different surface charges in the second and third channel portions, 106 and 304 respectively, is to propagate different levels of electroosmotic flow in these channels, e.g., either different levels of flow in he same direction, or flow in opposite directions. This different flow results in a creation of net pressure in the first channel portion 104. In the case of oppositely charged second and third channel portions, as shown in FIG. 3, the effect is to propagate electroosmotic flow in opposite directions, under the same voltage gradient. Electrodes 112 and 114 are then placed into electrical contact with the second and third channel portions 106 and 304, at the ends of these channels opposite from the channel junction 306, e.g., at reservoirs 36 and 318, respectively. Application of a voltage gradient from electrode 112 to electrode 114 (high to low) results in an electroosmotic flow of fluid within each of the second and third channel portions 106 and 304 toward the channel junction, as shown by arrows 310 and 312. The convergence of the fluid flow from each of the second and third channel portions 106 and 304 results in a pressure based flow within first channel portion 104, as shown by arrow 314. Again, each of second and third channel portions is optionally provided with a narrowed cross-sectional dimension, at least as to a portion of the channel portion (not shown), relative to the remainder of the channel structure, so as to optimize the level of pressure produced by the pump. It is notable that in the case of the micropump where the second channel portion is charged and the third channel portion is neutral, the pump is virtually the same structure as that illustrated in FIG. 2, wherein the flow restrictive channel merely lacks a surface charge, instead of incorporating a fluid barrier.

In addition to creating positive pressures in the first channel portion, it should be noted that by reversing the direction of the voltage gradient applied across the pumping channels, the flow and thus the pressure produced in the first channel portion will be reversed, e.g., creating a negative pressure within the first channel portion. Such drawing pumps have a variety of uses including use as sampling systems for drawing samples into microfluidic analyzers, e.g., from sample wells in microtiter plates, patients, and the like.

As noted above the pressure based micropumps of the present invention have a variety of uses. In particular, such micropumps combine the ease of fabrication and operation of electrokinetic material transport systems, with the benefits attendant to pressure-based flow, such as lack of electrophoretic biasing, bulk flow of materials that are otherwise difficult to transport, e.g., under E/O flow, such as large particulate matter, etc.

In one preferred aspect, the pressure-based micropumps according to the present invention are useful as integrated fluid transport and direction systems in microfluidic systems, which may in turn be used to perform any of a variety of chemical, biochemical, biological or other analytical or synthetic operations as described above. In particular, these electroosmotic pressure pumps are readily incorporated into any of a number of previously described microfluidic systems, e.g., those employing purely mechanical fluid direction systems, or those employing purely electrokinetic fluid direction systems. In the latter case, a micropump as described herein is readily substituted for each of the ports in a controlled electrokinetic system. Controlled electrokinetic systems are described in detail in Published International Application WO 96/04547, to Ramsey, which is incorporated herein by reference in its entirety.

In alternate preferred aspects, the pressure-based micropumps of the present invention are useful for interfacing microfluidic devices with more conventional systems, e.g., conventional analytical equipment, such as mass spectrometers, HPLC, GC, etc. Specifically, these micropumps are capable of injecting small amounts of fluid from a microfluidic system into a fluid interface to such equipment without requiring a potential gradient through that interface.

Additionally, such micropumps are particularly useful for dispensing small amounts of fluid in a controlled manner, from a microfluidic system, device or storage vessel. For example, in preferred aspects, these pumps are useful in the controlled administration of pharmaceutical compounds, e.g., in human or veterinary applications. Such devices may be placed against the skin of a patient, e.g., for transdermal delivery, or alternatively, may be implanted subcutaneously, for direct administration. In an alternate example, such pumps are useful in dispensing very small amounts of material for subsequent reaction or location, e.g., in combinatorial synthesis of chemical species; on substrate surfaces, i.e., high density chemical or polymer arrays.

EXAMPLES

As noted above, the micropumps of the present invention are readily integrated into a variety of microfluidic systems, including screening assay systems, e.g., as described in commonly assigned U.S. application Ser. No. 08/761,575, filed Dec. 6, 1996, and Ser. No. 08/833,279, filed Apr. 4, 1997, and incorporated herein by reference in their entirety.

Figure 4:
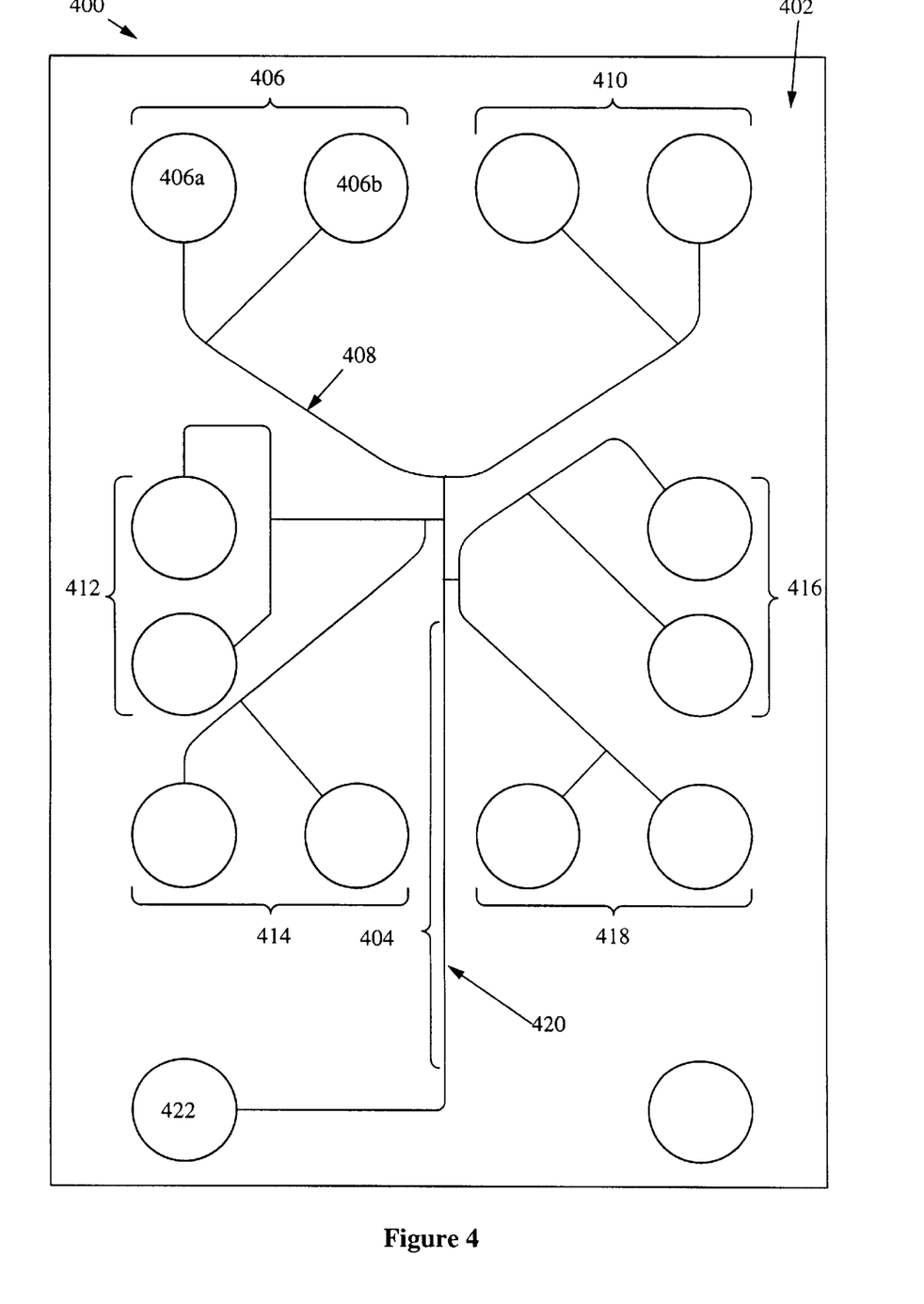
FIG. 4 is a schematic illustration of a microfluidic device for carrying out continuous enzyme/inhibitor screening assays, and incorporating several integrated micropumps according to the present invention.

FIG. 4 illustrates a continuous flow assay system used to perform enzyme inhibitor assays. The channel geometry of the device was previously utilized for this same purpose, but in conjunction with a controlled electrokinetic transport system. As shown however, the individual ports of the electrokinetic device are each substituted with an electroosmotic pressure-based micropump according to the present invention. Specifically, an electroosmotic pressure pump including two separate port/reservoirs is placed at the originating end of the channels of the device. Together, each group of two port/reservoirs is termed a "pump module."

As shown, the device 400 is fabricated in a body structure 402 and includes a main analysis channel 404, in which the enzyme/inhibitor screening assays are carried out. A chromogenic, fluorogenic, chemiluminescent or fluorescent substrate is delivered to the main analysis channel from pump module 406, which includes reservoir/ports 406*a* and 406*b*, which provide the same function as ports 216 and 218 in FIG. 2 or ports 218 and 314 in FIG. 3. Specifically, a voltage gradient is applied along the length of the channel portion connecting these two ports, such that a positive pressure based flow is created in channel 408. Prior to entering the analysis channel, the substrate is typically diluted with an appropriate assay buffer from pump module 410. Appropriate dilutions are obtained by modulating the amount of pressure produced by each of pump modules 406 and 410.

Inhibitor is continuously transported into the analysis channel from pump module 412, and mixed with more diluent/assay buffer from pump module 414. The dilute inhibitor is then contacted with the dilute substrate mixture in the analysis channel. At a downstream portion of the analysis channel, e.g., closer to waste reservoir 422, enzyme is continuously introduced into the analysis channel from pump module 416. Again, the enzyme may be delivered in full strength form or diluted with appropriate diluent/assay buffer from pump module 418. The relative rates at which the various materials are introduced into the analysis channel are controlled by the amount of pressure produced by each pump module, which in turn is related to the amount of current applied across a given pump module. The results of the various inhibitor screens are then determined at a detection point 420 along the analysis channel 404, e.g., using a fluorescence detection system.

This example merely illustrates one application of an integrated micropump according to the present invention. It will be readily appreciated upon reading the instant disclosure, that these micropumps have a wide range of applications.

Although the present invention has been described in some detail by way of illustration and example for purposes of clarity and understanding, it will be apparent that certain changes and modifications may be practiced within the scope of the appended claims. All publications, patents and patent applications referenced herein are hereby incorporated by reference in their entirety for all purposes as if each such publication, patent or patent application had been individually indicated to be incorporated by reference.

What is claimed is:

1. A microfluidic device, comprising:
a body structure comprising a substrate layer having at least one microscale channel fabricated into a surface thereof; and
an integrated micropump in fluid communication with the at least one microscale channel, the micropump comprising:
a first fluid containing microscale channel portion having first and second ends;
a second fluid containing microscale channel portion having first and second ends, the second channel portion having a first effective surface charge associated with walls of the second channel portion, the first end of the second channel portion in fluid communication with the first end of the first channel portion at a first channel junction; and
a means for applying a voltage gradient between the first and second ends of the second fluid containing channel portion to electroosmotically move fluid through the second channel portion while applying substantially no voltage gradient between the first and second ends of the first fluid containing channel portion.

2. The microfluidic device of claim 1, wherein the second channel portion has a smaller cross sectional area than the first channel portion.

3. A microfluidic device comprising:
a body structure comprising a substrate layer having at least a first microscale channel fabricated into a surface thereof; and
an integrated micropump in fluid communication with at least one microscale channel, the micropump comprising:
a first fluid containing microscale channel portion having first and second ends;
a second fluid containing microscale channel portion having first and second ends, the second channel portion having a first effective surface charge associated with walls of the second channel portion, the first end of the second channel portion in fluid communication with the first end of the first channel portion at a first channel junction; and
a means for applying a voltage gradient between the first and second ends of the second channel portion to electroosmotically move fluid through the second channel portion while applying substantially no voltage gradient between the first and second ends of the first channel portion, wherein the means for applying a voltage gradient between the first and second ends of the second channel portion comprises
a first electrode placed in electrical communication with the first channel junction;
a second electrode placed in electrical communication with the second end of the second channel portion; and
a power source electrically coupled to each of the first and second electrodes, whereby the power source is capable of delivering a different potential to each of the first and second electrodes.

4. The microfluidic device of claim 3, further comprising a first port in electrical communication with the first channel junction via a flow restrictive channel, the first electrode being placed in electrical contact with the first port.

5. The microfluidic device of claim 4, wherein the flow restrictive channel comprises a gel matrix disposed therein for substantially reducing fluid flow therethrough.

6. The microfluidic device of claim 4, wherein the flow restrictive channel comprises a channel connecting the port with the first channel junction, and having a substantially neutral surface charge.

7. A microfluidic device comprising:
a body structure comprising a substrate layer having at least a first microscale channel fabricated into a surface thereof; and an integrated micropump in fluid communication with at least one microscale channel, the micropump comprising:

a first fluid containing microscale channel portion having first and second ends;

a second fluid containing microscale channel portion having first and second ends, the second channel portion having a first effective surface charge associated with walls of the second channel portion, the first end of the second channel portion in fluid communication with the first end of the first channel portion at a first channel junction;

at least a third fluid containing microscale channel portion having a first end and a second end, the first end of the third channel portion in fluid communication with the first channel junction;

a means for applying a voltage gradient between the first and second ends of the third fluid containing channel portion to electroosmotically move fluid through the third channel portion; and a means for applying a voltage gradient between the first and second ends of the second channel portion to electroosmotically move fluid through the second channel portion, while applying substantially no voltage gradient between the first and second ends of the first channel portion.

8. The microfluidic device of claim 7, wherein the means for applying a voltage gradient between the first and second ends of the third channel comprises:

a first electrode placed in electrical communication with the first channel junction;

a second electrode placed in electrical communication with the second end of the third channel; and a power source electrically coupled to each of the first and second electrodes, whereby the power source is capable of delivering a different potential to each of the first and second electrodes.

9. The microfluidic device of claim 7, wherein the third channel portion has a second surface charge associated with walls of the third channel portion, the second surface charge being substantially opposite to the first surface charge, and wherein the means for applying a voltage gradient between the first and second ends of the third channel portion comprises:

a first electrode in electrical communication with the second end of the second channel portion;

a second electrode in electrical communication with the second end of the third channel portion; and a power source electrically coupled to each of the first and second electrodes, whereby the power source is capable of delivering a different voltage to each of the first and second electrodes.

10. The microfluidic device of claim 7, wherein the third channel portion comprises a smaller cross sectional area than the first channel portion.

11. A micropump, comprising:

a body comprising a substrate layer having a plurality of channel portions fabricated into a surface thereof, the channel portions including:

a first fluid containing microscale channel portion having first and second ends;

a second microscale channel portion having first and second ends, the second channel portion having a first effective surface charge associated with walls of the second channel portion, the first end of the second channel portion in fluid communication with the first end of the first channel portion at a first channel junction;

a third microscale channel portion having first and second ends, the third channel portion having a second effective surface charge associated with the walls of the third channel portion, the second effective surface charge being substantially opposite to the first effective surface charge, the first end of the third channel portion in fluid communication with the first channel junction; and a means for applying a voltage gradient between the second end of the second channel portion and the second end of the third channel portion to electroosmotically move fluid through the second and third channel portions, while applying substantially no voltage gradient between the first and second ends of the first channel portion.

12. The micropump of claim 11, wherein the means for applying a voltage gradient comprises:

a first electrode in electrical communication with the second end of the second channel portion;

a second electrode in electrical communication with the second end of the third channel portion; and a power source electrically coupled to each of the first and second electrodes, whereby the power source is capable of delivering a different voltage to each of the first and second electrodes.

13. The micropump of claim 11, wherein the third channel portion comprises a smaller cross sectional area than the first channel portion.

14. A micropump comprising:

a substrate comprising:

a first microscale channel portion fabricated into a surface of the substrate, the first channel portion having first and second ends, walls of the first channel portion having substantially neutral surface charge associated therewith;

a second fluid containing microscale channel portion fabricated into a surface of the substrate, the second channel portion having first and second ends, the second channel portion having a first surface charge associated with walls of the second channel portion, the first end of the second channel portion in fluid communication with the first end of the first channel portion at a first channel junction; and a means for applying a voltage gradient between the first and second ends of the second channel portion to electroosmotically move fluid through the second channel portion.

15. A micropump comprising:

a substrate comprising:

a first microscale channel portion fabricated into a surface of the substrate, the first channel portion having first and second ends, walls of the first channel portion having substantially neutral surface charge associated therewith;

a second microscale channel portion fabricated into a surface of the substrate, the second channel portion having first and second ends, the second channel portion having a first surface charge associated with walls of the second channel portion, the first end of the second channel portion in fluid communication with the first end of the first channel portion at a first channel junction; and a means for applying a voltage gradient between the first and second ends of the second channel portion wherein the means for applying a voltage gradient between the first and second ends of the second channel portion comprises
a first electrode placed in electrical communication with the first channel junction;
a second electrode placed in electrical communication with the second end of the second channel portion; and
a power source electrically coupled to each of the first and second electrodes, whereby the power source is capable of delivering a different potential to each of the first and second electrodes.

16. A micropump comprising:
a substrate comprising:
a first microscale portion fabricated into a surface of the substrate, the first channel portion having first and second ends, walls of the first channel portion having substantially neutral surface charge associated therewith;
a second microscale channel portion fabricated into a surface of the substrate, the second channel portion having first and second ends, the second channel portion having a first surface charge associated with walls of the second channel portion, the first end of the second channel portion in fluid communication with the first end of the first channel portion at a first channel junction; and
a means for applying a voltage gradient between the first and second ends of the second channel portion wherein the means for applying a voltage gradient between the first and second ends of the second channel portion comprises:
a first electrode placed in electrical communication with the second end of the first channel portion;
a second electrode placed in electrical communication with the second end of the second channel portion; and
a power source electrically coupled to each of the first and second electrodes, whereby the power source is capable of delivering a different potential to each of the first and second electrodes.

17. A micropump comprising:
a substrate comprising:
a first microscale portion fabricated into a surface of the substrate, the first channel portion having first and second ends, walls of the first channel portion having substantially neutral surface charge associated therewith;
a second microscale channel portion fabricated into a surface of the substrate, the second channel portion having first and second ends, the second channel portion having a first surface charge associated with walls of the second channel portion, the first end of the second channel portion in fluid communication with the first end of the first channel portion at a first channel junction;
at least a third microscale channel portion having a first end and a second end, the first end of the third channel portion in fluid communication with the first channel junction; and
a means for applying a voltage gradient between the first and second ends of the second channel portion and between the first and second ends of the third channel portion.

18. The micropump of claim 17, wherein the means for applying a voltage gradient between the first and second ends of the third channel comprises:
a first electrode placed in electrical communication with the second end of the first channel;
a second electrode placed in electrical communication with the second end of the third channel; and
a power source electrically coupled to each of the first and second electrodes, whereby the power source is capable of delivering a different potential to each of the first and second electrodes.

19. The micropump of claim 18, wherein the second electrode is placed in electrical contact with a first channel header, and wherein each of the second end of the second channel portion and the second end of the third channel portion are in fluid communication with the first channel header.

20. A microfluidic device including an integrated micropump, the device comprising:
a solid substrate;
first, second and third channel portions fabricated into a surface of the substrate, each of the first, second and third channel portions having first and second ends, respectively, the second ends of the first, second and third channel portions being in fluid communication at a first channel junction, and wherein the second and third channel portions have surface charges associated with walls of the second and third channel portions, respectively; and
a means for applying a voltage gradient between the first end of the second channel portion and the first end of the third channel portion.

21. The microfluidic device of claim 20, wherein the third channel portion has a surface charge density that is substantially less than a surface charge density of the second channel portion.

22. The microfluidic device of claim 21, wherein the surface charge density of the third channel portion is at least 20% less than the surface charge density of the second channel portion.

23. The microfluidic device of claim 21, wherein the surface charge density of the third channel portion is at least 50% less than the surface charge density of the second channel portion.

24. The microfluidic device of claim 20, wherein the third channel portion has substantially no surface charge associated with the walls of the third channel portion.

25. The microfluidic device of claim 20, wherein the second and third channel portions have substantially opposite surface charges.

26. The microfluidic device of claim 20, wherein the means for applying a voltage gradient between the first end of the second channel portion and the first end of the third channel portion comprises a first electrode disposed in electrical contact with the first end of the second channel portion and a second electrode disposed in electrical contact with the third channel portion, each of the first and second electrodes being connected to an electrical controller for delivering a different voltage to each of the first and second electrodes.

27. A method of pumping fluid in a microscale channel structure, comprising:
providing a first channel portion and a second channel portion of the channel structure, the second channel portion being in fluid communication with the first channel portion, at least the second channel portion having a surface charge associated with its walls;
applying a voltage gradient along a length of the second channel portion to produce an electroosmotically induced pressure within the second channel portion;

communicating the electroosmotically induced pressure from the second channel portion to an end of the first channel portion.

28. A method of pumping a fluid in a first microscale channel, comprising:

providing a second microscale channel portion in fluid communication with the first channel, the second channel portion having a surface charge associated with its walls;

applying a voltage gradient along a length of the second channel but not along the length of the first channel portion, whereby a fluid in the second channel portion is electroosmotically pumped into the first channel portion, thereby pumping a fluid in the first channel portion.

29. The microfluidic device of claim 1, 3, 7, 11, 14, 15, 16, 17 or 20, further comprising a cover layer mated with the surface of the substrate to seal the channel or channel portions.

* * * * *